(12) United States Patent
Pierce et al.

(10) Patent No.: US 9,243,481 B1
(45) Date of Patent: Jan. 26, 2016

(54) MAGNETICALLY COUPLED EXPANDER PUMP WITH AXIAL FLOW PATH

(71) Applicant: GEOTEK ENERGY, LLC, Frisco, TX (US)

(72) Inventors: Michael Pierce, Erie, CO (US); Allen Swenson, Frisco, TX (US); Angel Sanchez, Plano, TX (US); Blake Sellers, Frisco, TX (US)

(73) Assignee: GEOTEK ENERGY, LLC, Frisco, TX (US)

( * ) Notice: Subject to any disclaimer, the term of this patent is extended or adjusted under 35 U.S.C. 154(b) by 0 days.

(21) Appl. No.: 14/828,812

(22) Filed: Aug. 18, 2015

Related U.S. Application Data

(63) Continuation-in-part of application No. PCT/US2014/023310, filed on Mar. 11, 2014, which is a continuation of application No. 13/797,856, filed on Mar. 12, 2013.

(51) Int. Cl.
| | |
|---|---|
| *E21B 43/12* | (2006.01) |
| *E21B 33/12* | (2006.01) |
| *E21B 34/06* | (2006.01) |
| *E21B 17/18* | (2006.01) |

(Continued)

(52) U.S. Cl.
CPC .............. *E21B 43/129* (2013.01); *E21B 17/18* (2013.01); *E21B 33/12* (2013.01); *E21B 34/06* (2013.01); *E21B 43/128* (2013.01); *F03G 7/04* (2013.01); *F04B 37/02* (2013.01); *F04B 37/04* (2013.01); *F04D 13/026* (2013.01); *F04D 13/10* (2013.01); *F04D 29/0413* (2013.01); *Y02E 10/10* (2013.01)

(58) Field of Classification Search
CPC ....... E21B 43/129; E21B 34/06; E21B 17/18; E21B 43/00; E21B 33/00; F04B 37/02; F04B 37/04; F04D 29/0413
USPC ......................................... 417/420, 405, 408
See application file for complete search history.

(56) References Cited

U.S. PATENT DOCUMENTS

| | | | | |
|---|---|---|---|---|
| 3,905,196 A | * | 9/1975 | Govindarajan | ........... F01K 3/18 417/379 |
| 4,077,220 A | * | 3/1978 | Matthews | ................. F03G 7/04 417/366 |

(Continued)

FOREIGN PATENT DOCUMENTS

| | | |
|---|---|---|
| RU | 2005212 C1 | 12/1993 |
| WO | 2013059701 A1 | 4/2013 |
| WO | 2014164720 A1 | 10/2014 |

*Primary Examiner* — Devon Kramer
*Assistant Examiner* — Evan Cox
(74) *Attorney, Agent, or Firm* — Buskop Law Group, PC; Wendy Buskop

(57) ABSTRACT

A compressor free, generator free system production well for accelerated oil and gas removal from a reservoir using a magnetically coupled expander pump assembly, which include an outer expansion turbine that rotates around a pump. A magnetic coupling couples the expansion turbine to the pump. An inner portion of the magnetic coupling can be coupled to a pump shaft that drives the pump. An outer portion of the magnetic coupling can be driven by the expansion turbine, which rotates circumferentially around the pump. The expansion turbine drives the fluid to pump a driven fluid stream through the magnetic coupling. In this manner, flow directions of both driving and driven fluid streams remain separate and coaxial, thereby facilitating a reduction in an overall diameter of the expander pump assembly.

15 Claims, 4 Drawing Sheets

(51) Int. Cl.
 *F04D 13/02* (2006.01)
 *F04B 37/02* (2006.01)
 *F03G 7/04* (2006.01)
 *F04D 13/10* (2006.01)
 *F04D 29/041* (2006.01)
 *F04B 37/04* (2006.01)

(56) References Cited

U.S. PATENT DOCUMENTS

| | | | |
|---|---|---|---|
| 4,142,108 A | 2/1979 | Matthews | |
| 4,215,976 A | 8/1980 | Neumann | |
| 4,448,022 A * | 5/1984 | Aplenc | B01D 45/16 417/379 |
| 5,332,374 A | 7/1994 | Kricker et al. | |
| 5,464,333 A | 11/1995 | Okada et al. | |
| 5,649,425 A * | 7/1997 | Matsumura | F01K 25/10 60/648 |
| 6,089,832 A * | 7/2000 | Patterson | E21B 23/02 166/68.5 |
| 7,451,835 B1 * | 11/2008 | Hall | E21B 41/0085 166/65.1 |
| 2001/0009645 A1 * | 7/2001 | Noda | F04D 13/027 417/355 |
| 2001/0027652 A1 | 10/2001 | White | |
| 2001/0043865 A1 * | 11/2001 | Rennett | F04D 29/0413 417/44.1 |
| 2001/0043871 A1 * | 11/2001 | Rennett | F04D 13/027 417/368 |
| 2002/0028147 A1 * | 3/2002 | Gabrieli | F04D 13/026 417/365 |
| 2002/0187037 A1 * | 12/2002 | Lee | E21B 43/128 415/1 |
| 2005/0135944 A1 * | 6/2005 | Matic | E21B 43/129 417/405 |
| 2007/0056285 A1 | 3/2007 | Brewington | |
| 2010/0233007 A1 | 9/2010 | Muscarella et al. | |
| 2011/0079380 A1 * | 4/2011 | Tyler | E21B 36/00 166/57 |
| 2011/0176948 A1 | 7/2011 | Shaffer | |
| 2013/0115042 A1 * | 5/2013 | Mariotti et al. | F04D 29/0516 415/1 |
| 2014/0271720 A1 | 9/2014 | Pierce et al. | |
| 2015/0121868 A1 | 5/2015 | Fryrear et al. | |

* cited by examiner

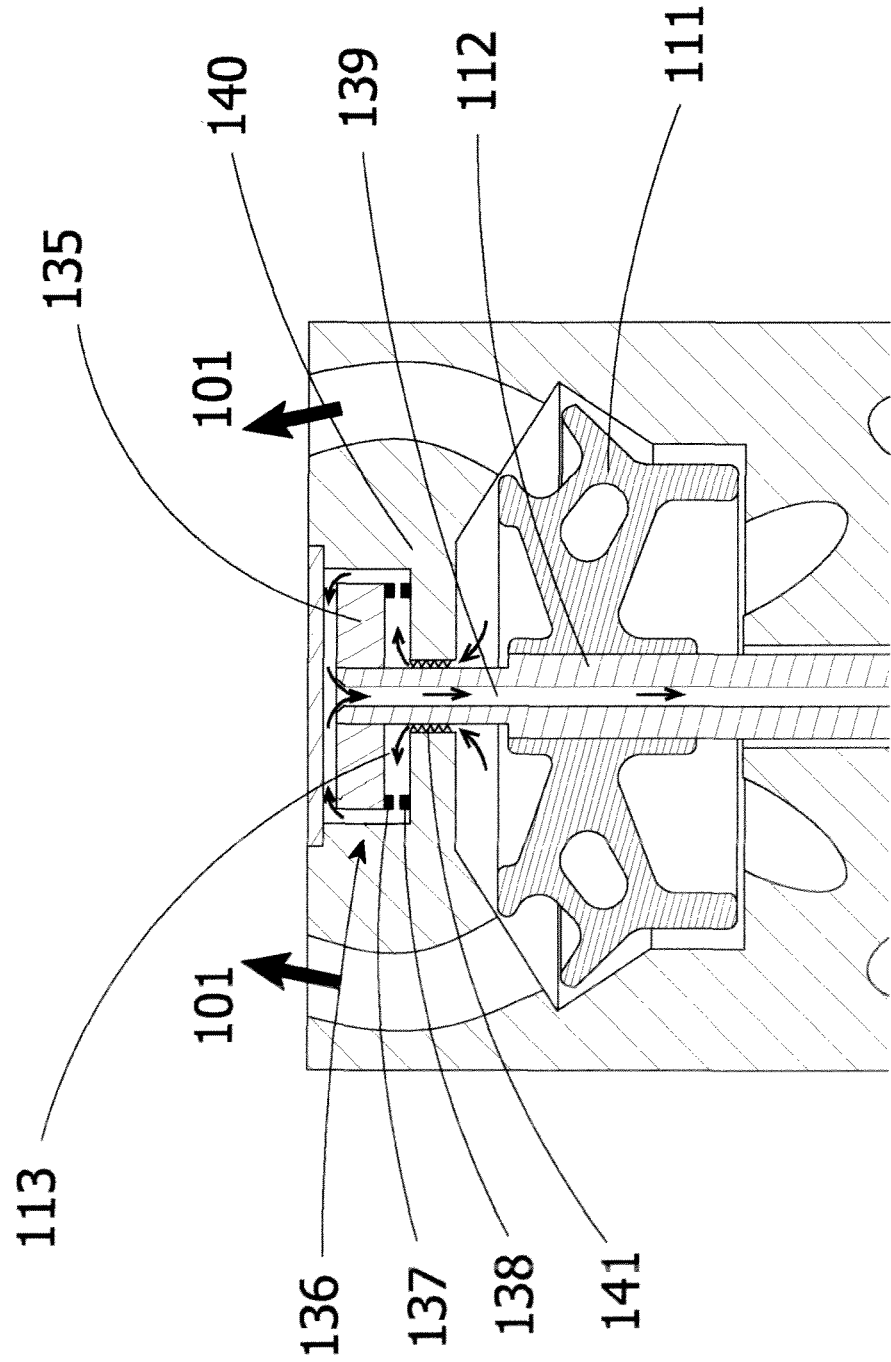

MAGNETICALLY COUPLED EXPANDER PUMP WITH AXIAL FLOW PATH

CROSS REFERENCE TO RELATED APPLICATIONS

The current application is a Continuation in Part of co-pending International Patent Application Serial No.: PCT/US2014/023310 filed on Mar. 11, 2014, which is a Continuation of co-pending U.S. patent application Ser. No. 13/797,856 filed on Mar. 12, 2013, both entitled "MAGNETICALLY COUPLED EXPANDER PUMP WITH AXIAL FLOW PATH". These references are hereby incorporated in their entity.

FIELD

The following disclosure relates to a pump arrangement and in particular, to a magnetically coupled expander pump with an axial flow path.

BACKGROUND

A need exists for a magnetically coupled, expander-driven pump, wherein the pumped fluid is able to flow through the center of a magnetic coupling.

The present embodiments meet this need.

BRIEF DESCRIPTION OF THE DRAWINGS

The detailed description will be better understood in conjunction with the accompanying drawings as follows:

FIG. 2B shows an exploded sectional view of a portion of the expander pump unit shown in FIG. 2A according to one or more embodiments.

Figure 1:
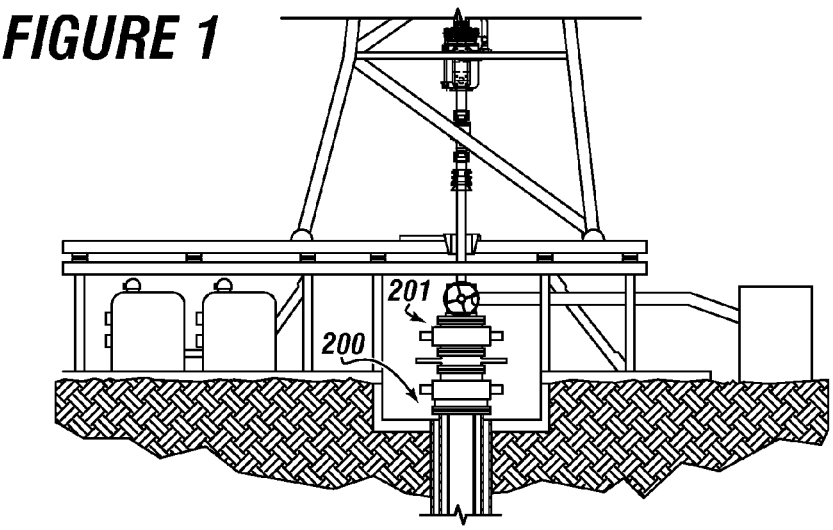
FIG. 1 shows a sectional view of a compressor free generator free production well for accelerated oil and gas removal from a reservoir according to one or more embodiments.
Figure 1:
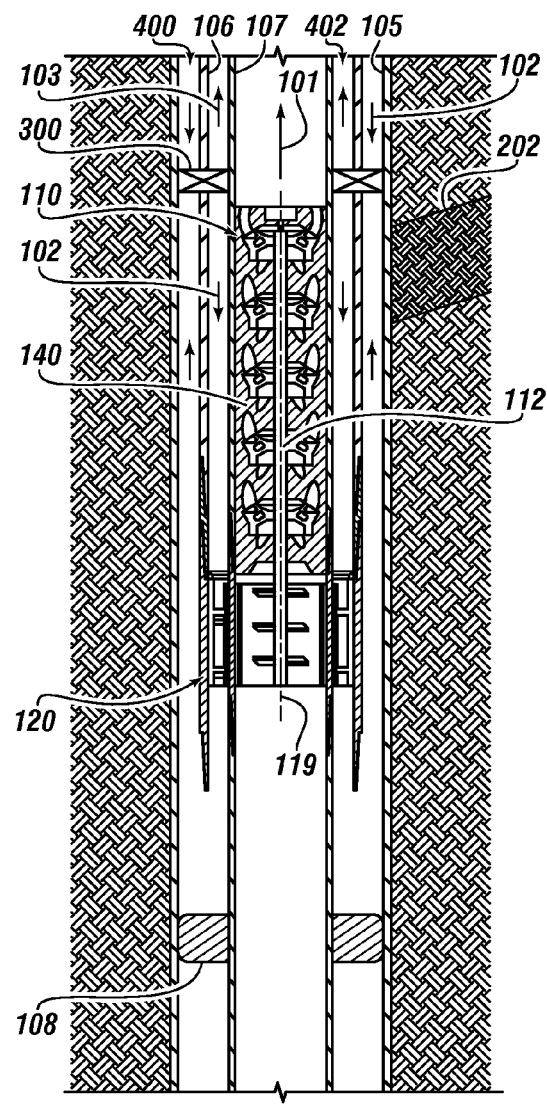

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Magnetic couplings can have uses in various applications related to pumping fluids, particularly when isolation of the pumped fluid is desired. Typical magnetic coupling arrangements include disc ("face-to-face") magnetic drive arrangements and coaxial canister-type coupling arrangements with axially aligned drive shafts which can be used to transfer torque to a completely isolated fluid path. In such typical arrangements, the fluid flow can be redirected in a perpendicular direction between inlet and outlet as it passes through the pump. However, there can be some applications in which such a redirection of the fluid flow is not desirable.

Some pumps with magnetic couplings can be driven by a motor. However, it can be possible for the driving torque to be provided by an expansion turbine. A pressurized working fluid can be fed into one annulus of a set of concentric pipes and allowed to build pressure as it flows down a geothermal power wellbore. Within the wellbore, heat can be added to the pressurized working fluid, and the hot, high pressure fluid then flows through an expander before returning to the surface in a lower density condition. The expansion of the pressurized working fluid can provide torque that can be used to drive the geothermal fluid pump.

Some prior art teaches a canister-type cylindrical magnetic coupling that can be used to transfer torque from the expander, which can be positioned vertically above the pump. The geothermal fluid in the well can feed the inlet of the pump in the center of the well, but the geothermal fluid can be discharged at the outlet of the pump in an essentially perpendicular direction with respect to the inlet direction, subsequently flowing up the well in the outer annulus.

In a first aspect of the prior art, an expander pump unit can be described in which an expander can be located surrounding the pump. A pressurized working fluid provided in the annulus surrounding a center pipe can flow through an expansion turbine (hereinafter referred to as an expander), causing it to rotate around the center pipe. The torque generated by the expander can be transferred to a rotating drive shaft, which can be coupled to the pump, in the middle of the center pipe via the use of an open-ended magnetic coupling. The pump can increase the pressure of a pumped fluid contained within the center pipe to move the pumped fluid axially through the pipe.

The magnetic coupling described herein can be comprised of outer and inner magnet-bearing cylinders, separated by a non-magnetic cylindrical wall that can be formed as a single unit or attached to the center pipe. The non-magnetic cylindrical wall can provide separation of the two fluid streams. The outer magnet-bearing cylinder can be integrated with the expander. The inner magnet-bearing cylinder can be connected to the pump shaft by rigid spokes around which fluid can pass.

This arrangement can be applicable to a system in which a pressurized working fluid can be used to drive a pump, and in which the allowable apparatus diameter may be limited. More specifically, the pumped stream flow path can be maintained in an axial direction, such as in a section of straight pipe, particularly as may be found in the wellbore for geothermal or oil and gas production.

In a second aspect, an expander pump unit is described, in which the pump can be disposed in a pipe, and the pump can be constructed to pump a first fluid. The expander pump unit can include an expander disposed in an annular space surrounding the pipe. The expander can be driven by a second fluid flowing in the annular space. The expander pump unit further can include the magnetic coupling comprising an inner rotating cylinder connected to the pump within the pipe and an outer rotating cylinder connected to the expander surrounding the pipe. The inner rotating cylinder can have open ends in fluid communication with the pump.

In a third aspect, an expander pump unit can be described, in which the expander pump unit can include a pump disposed in a pipe, and the pump can be constructed to pump a first fluid. The expander pump unit also can include a pump driver constructed to drive the pump. The expander pump unit can further include the magnetic coupling comprising the inner rotating cylinder connected to the pump within the pipe, and the outer rotating cylinder connected to the pump driver surrounding the pipe. The inner rotating cylinder can have open ends in fluid communication with the expander pump unit.

A benefit of this invention can be increased productivity to a well operator, associated with greater reliability of ThermalDrive vs. electric submersible pumps (ESP), e.g., reduced down time.

Other benefits can include reduced carbon footprint for operators by using the latent heat contained in the well vs. electricity. Using the latent heat contained in the well can (a) reduce operating costs to an operator associated with reductions in the parasitic load for pumping; (b) reduce maintenance costs to an operator associated with wire-line retrieval of the pump; and/or (c) reduce costs to a well operator due to co-generation of electricity at the surface (if the resource can be energetic enough) and provides supplemental income.

The term "exchange with the upwardly flowing working fluid" can refer to the physical replacement of a downwardly flowing working fluid in the annular space of the upwardly flowing working fluid.

FIG. 1 shows a sectional view of a compressor free generator free production well for accelerated oil and gas removal from a reservoir according to one or more embodiments.

A wellbore 200 can be formed through a formation 202.

The well casing 105 can be installed in the wellbore 200.

A wellhead 201 can be connected to the well casing 105.

An outer pipe 106 can be installed in the well casing 105 and can be concentrically mounted within the well casing 105 forming a first annular space 400 between the well casing 105 and the outer pipe 106.

An inner pipe 107 with an inner pipe axis 119 can be installed in the outer pipe 106 for conveying the production fluid 101 concentrically mounted within the outer pipe 106 forming a second annular space 402 between the outer pipe 106 and the inner pipe 107.

A rotating expander 120 can be attached to one end of the inner pipe 107.

The rotating expander 120 can be located between the inner pipe 107 and the outer pipe 106 for extracting energy from the downwardly flowing working fluid 102.

The wellbore 200 can also include a pump 110 with a pump shaft 112 and a pump housing 140. The pump 110 can connect to the inner pipe 107 for flowing or directing the flow of the production fluid 101 to the wellhead 201.

The downwardly flowing working fluid 102 can feed the rotating expander 120 initially by flowing into a first annular space 400 in the well and then transferring into the second annular space 402 adjacent the production fluid to reach the rotating expander 120 becoming a supercritical fluid as hydrostatic pressure and heat is applied.

Upwardly flowing working fluid 103 can flow between the outer pipe 106 and the inner pipe 107 in the second annular space 402 contacting the inner pipe 107 to exchange heat with the production fluid 101.

The upwardly flowing working fluid 103 can exit the rotating expander 120 into the first annular space 400 then flow to the wellhead 201 through the second annular space 402.

A packer 108 can be used for sealing the space between the inner pipe 107 and the well casing 105.

The compressor free, generator free system for the production well can provide accelerated oil and gas removal using heat exchanged with the production fluid 101 without expending energy from a compressor or a generator to perform the heat exchange.

A crossover 300 can be mounted between inner pipe 107 and the well casing 105 enabling the downwardly flowing working fluid 102 to exchange with the upwardly flowing working fluid 103 optimizing heat transfer between the production fluid 101 and the downwardly flowing working fluid 102 below the crossover 300 and the upwardly flowing working fluid above the cross over.

Figure 2A:
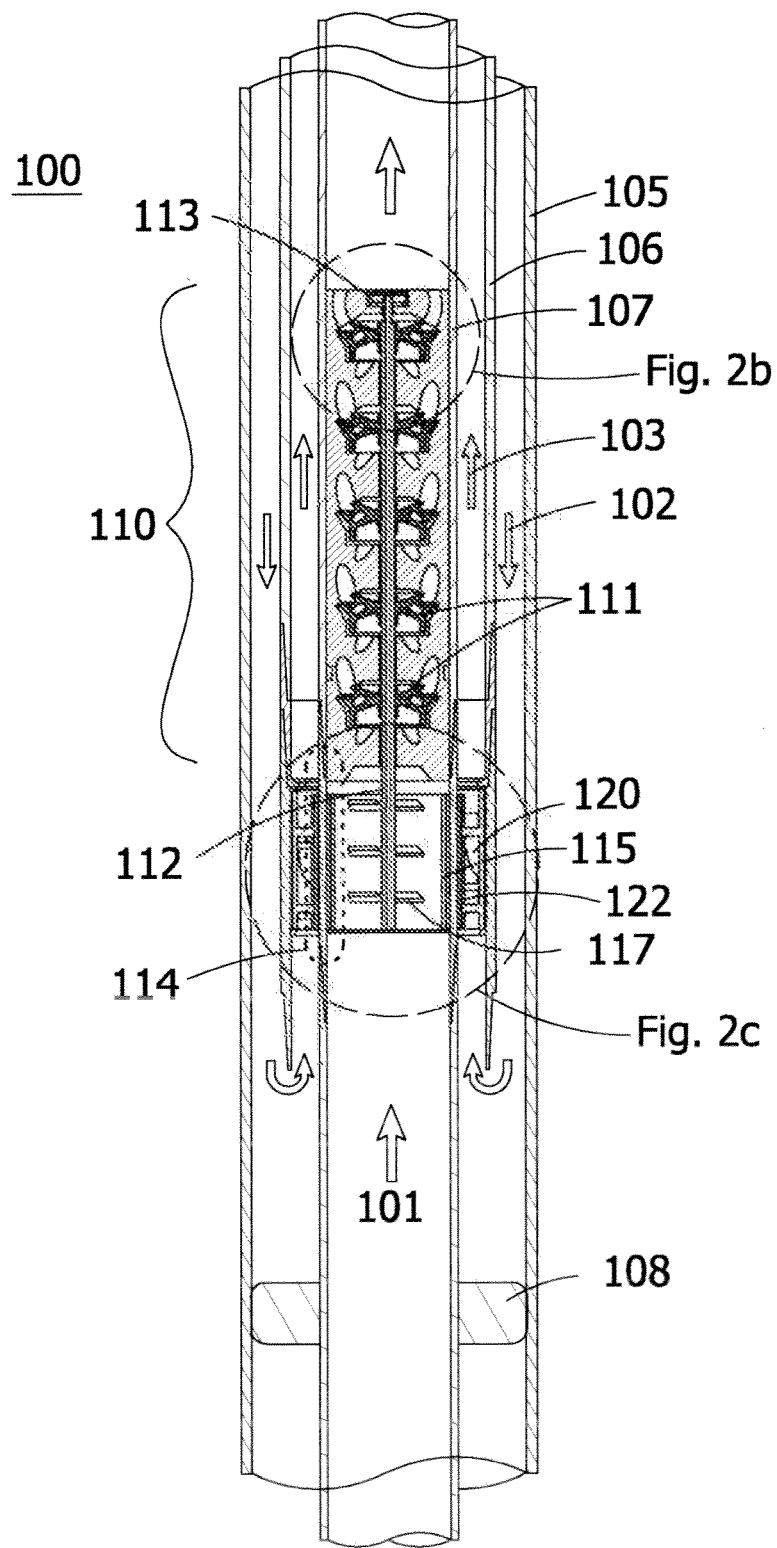
FIG. 2A shows a sectional view of an expander pump unit according to one or more embodiments.
Figure 2C:
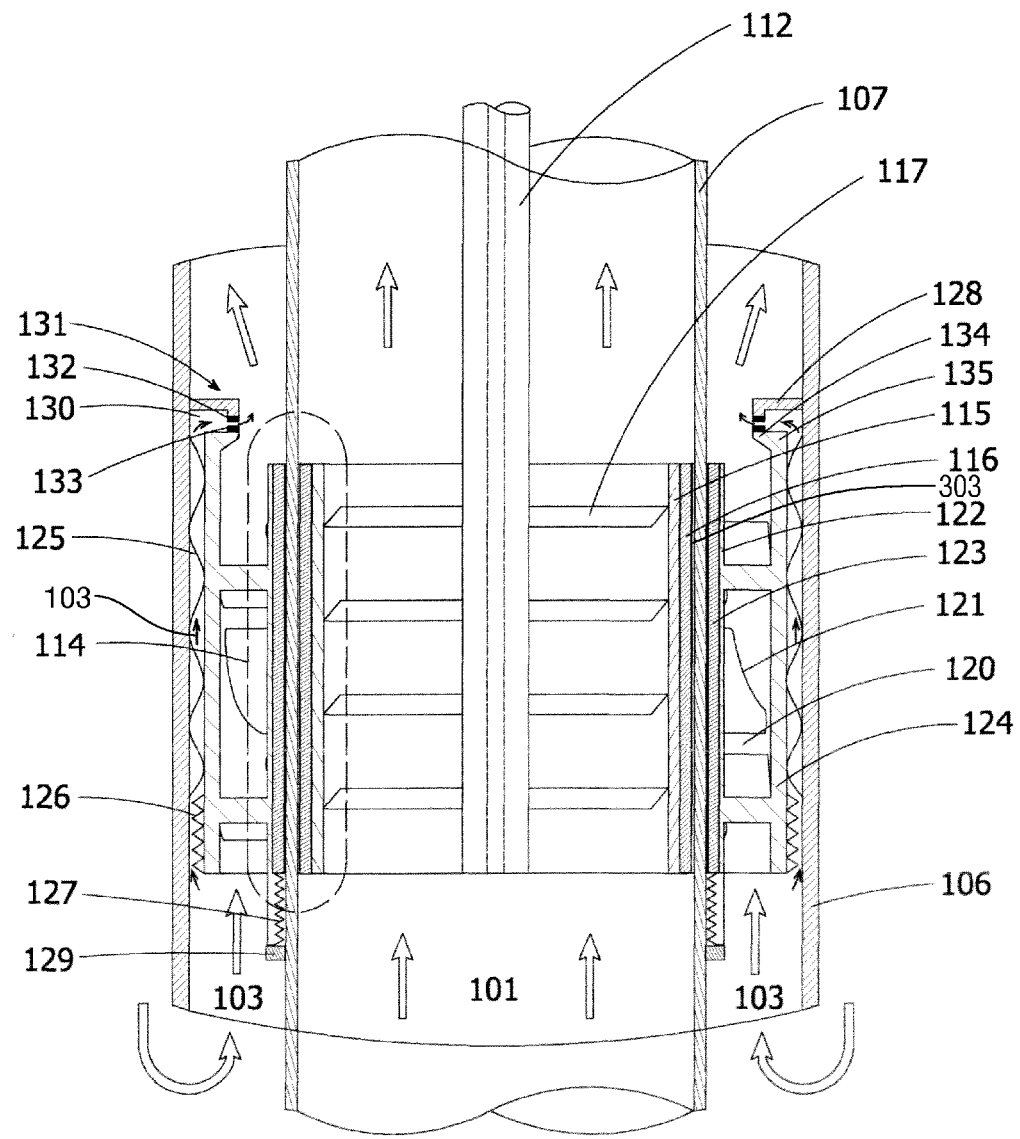
FIG. 2C shows an exploded sectional view of another portion of the expander pump unit shown in FIG. 2A according to one or more embodiments.

FIG. 2A shows a sectional view of an expander pump unit according to one or more embodiments. FIG. 2B shows an exploded sectional view of a portion of the expander pump unit shown in FIG. 2A according to one or more embodiments. FIG. 2C shows an exploded sectional view of another portion of the expander pump unit shown in FIG. 2A according to one or more embodiments.

Referring to FIGS. 2A-2C the rotating expander 120 can be depicted with an outer wall 124 and a plurality of integral expander vanes 121, which can be attached to the outer wall 124.

The plurality of integral expander vanes 121 can convert a reduction of pressure in the downwardly flowing working fluid 102 into torque.

A retainer ring 129 can be depicted extending radially and outwardly from the inner pipe 107 toward the well casing 105 providing axial support for the rotating expander 120.

Also shown is a pump pressure balance chamber 113 between the pump housing 140 formed around the pump 110

A disc 135 can be attached to an upper end of the pump shaft 112, which can offset generated thrust produced by moving the production fluid 101 to the wellhead.

A labyrinth seal 141 can be interposed between the pump shaft 112 and the pump housing 140 to control the flow of the production fluid 101 into the pump pressure balance chamber 113, wherein the pump pressure balance chamber 113 can be positioned between the rotating expander 120 and the outer pipe 106 and wherein the pump pressure balance chamber 113 can compensate for axial thrust from the pump 110.

Embodiments depicted show an outer labyrinth seal 126 in the outer pipe 106, which can be configured to flow the upwardly flowing working fluid 103 through fluid bearings 125 and into the first annular space between the outer pipe 106 and the inner pipe 107 towards an expander chamber valve 131 between the outer pipe 106 and the inner pipe 107.

The expander chamber valve 131 can enable pressure of the upwardly flowing working fluid 103 to flow into an expander pressure balance chamber 130 of the rotating expander 120 and increase in pressure, exerting pressure simultaneously on an upper sealing flange 128 and a lower sealing flange 134 located between the outer pipe 106 and the inner pipe 107 opening the expander chamber valve 131 and moving the rotating expander 120 in a downward direction opposite the direction of flow of the upwardly flowing working fluid 103 flowing the downwardly flowing working fluid 102 into the first annular space formed between the outer pipe 106 and the inner pipe 107 above the rotating expander 120.

The fluid bearings 125 can radially support the rotating expander.

The outer labyrinth seal 126 in the outer pipe 106 can be configured to flow the upwardly flowing working fluid 103 through the fluid bearings 125 between the outer pipe 106 and the inner pipe 107 towards the expander chamber valve 131 between the outer pipe 106 and the inner pipe 107.

The expander chamber valve 131 can enable pressure of the upwardly flowing working fluid 103 to flow into the expander pressure balance chamber 130 of the rotating expander 120, which can increase pressure in the expander pressure balance chamber 130 exerting pressure simultaneously on the upper sealing flange 128 and the lower sealing flange 134 located between the outer pipe 106 and the inner pipe 107 opening the expander chamber valve 131 and moving the rotating expander 120 in a downward direction opposite the direction of flow of the upwardly flowing working fluid into the first annular space formed between the outer pipe 106 and the inner pipe 107 above the rotating expander 120.

In an embodiment, an inner labyrinth seal 127 attached to the rotating expander 120 can be used to bypass a portion of the upwardly flowing working fluid 103 around the rotating expander 120.

The pump shaft 112 can extend through an inner rotating cylinder 115.

The pump shaft 112 can have at least one spoke of a plurality of spokes 117. Each spoke of the plurality of spokes can extend from the pump shaft 112 and can connect to the inner rotating cylinder 115.

A hollow bore 139 can be formed in the pump shaft 112.

The hollow bore 139 can be configured to flow a portion of the production fluid 101 from the pump pressure balance chamber 113 through an open pump chamber valve 136 around the disc 135 into the hollow bore 139, whereupon the portion of the production fluid 101 can flow to a relatively low pressure below at least one of the plurality of spokes 117.

In embodiments, the disc 135 can have a second upper seal 137 configured to seal against a sealing surface 138 attached to the pump housing 140.

In embodiments, the expander chamber valve 131 can have a first upper seal 132 and a lower sealing surface 133.

In embodiments, the pump 110 can pump the production fluid 101 coaxially with the inner pipe 107.

In embodiments, a non-magnetic cylindrical wall 303 can separate an outer rotating cylinder 122 from an inner rotating cylinder 115.

The non-magnetic cylindrical wall 303 can be configured for separating the upwardly flowing production fluid 101 from either the downwardly flowing working fluid 102 or the upwardly flowing working fluid 103.

In embodiments of the compressor free, generator free system, a plurality of pump impellers 111 can be used in the pump 110.

The plurality of pump impellers 111 can increase pressure of the production fluid 101 enabling the production fluid 101 to flow to the wellhead inside of the inner pipe 107.

In embodiments, the pump 110 can be installable and retrievable through the inner pipe 107.

It should be noted that the rotating expander pump unit 100 can be located below ground in a cased wellbore, such as the rotating expander pump unit can be used in a geothermal or oil and gas production well. The well casing 105 can separate a surrounding geologic formation from the production fluid 101 contained within the compressor free generator free production well.

The packer 108 can be used for sealing the space between the inner pipe 107 and the well casing 105.

It should be noted that when arranged in the compressor free, generator free production well, the pump 110 can deliver the production fluid 101 upwardly from the producing formation to the surface. The production fluid 101 can flow through at least one of the plurality of spokes 117 internal to the inner rotating cylinder 115 before flowing into the pump 110. As the production fluid 101 flows into the pump 110 it can be directed into the first of a plurality of pump impellers 111 which can increase the pressure of the production fluid 101. Now at a higher pressure, the production fluid 101 can be able to flow to the surface inside the inner pipe 107.

Axial support for the pump shaft 112 can be provided by a pump pressure balance chamber 113, as shown in greater detail in FIG. 2B.

It should be noted the second upper seal 137 can be constructed, for example, from a low friction material that can also withstand high temperatures. One suitable material for the second upper seal can include, but is not limited to polyether ether ketone (PEEK). Other suitable materials can be used within the scope of the invention.

At startup and when the pump 110 is not operating, the pump chamber valve 136 can be closed. During operation of the pump 110, the plurality of pump impellers 111 and the pump shaft 112 can experience a thrust in a downward direction, opposite the direction of the production fluid 101 flow. The pump pressure balance chamber 113 can provide a means to offset the downward thrust so as to axially support the pump shaft 112.

A portion of the production fluid 101, shown by small solid arrows in FIG. 2B, can flow past the labyrinth seal 141 into the pump pressure balance chamber 113. The pressure of the production fluid 101 in the pump pressure balance chamber 113 can increase, exerting increased pressure between the pump housing 140 and the disc 135 tending to open the pump chamber valve 136 by moving the pump shaft 112 in an upward direction. The production fluid 101 flowing from the pump pressure balance chamber 113 through the open pump chamber valve 136 can subsequently proceed to flow around the disc 135 into the hollow bore 139 formed in the pump shaft 112, whereupon the production fluid 101 can flow to the relatively low pressure pump suction below at least one of the plurality of spokes 117, as shown in FIG. 2C.

Also, during operation, as pressure in the pump pressure balance chamber 113 decreases, the pump chamber valve 136 can close, allowing the disc 135 and the pump shaft 112 to move axially downward.

It should be noted that the plurality of integral expander vanes 121 can convert the reduction of pressure in the upwardly flowing working fluid 103 into rotating torque.

The outer labyrinth seal 126 and the inner labyrinth seal 127 can be attached, respectively, to the outer wall 124 and the outer rotating cylinder 122 to control the flow of the upwardly flowing working fluid 103 bypassing the rotating expander 120, as discussed in greater detail below. Fluid bearings 125, which can include foil bearings, can be interposed between the outer wall 124 and the outer pipe 106 to radially support the rotating expander 120. Axial support for the rotating expander 120 can be provided by the retainer ring 129, extending radially inwardly from the inner pipe 107 and an expander pressure balance chamber 130.

The expander pressure balance chamber 130 can be formed between the outer labyrinth seal 126, the lower sealing flange 134 extending from the disc 135 of the outer wall 124, and the upper sealing flange 128 extending inwardly from the outer pipe 106. The upper sealing flange 128 can include a first upper seal 132, which can be constructed to seal against a lower sealing surface 133 attached to the lower sealing flange 134. The first upper seal 132 can be constructed, for example, from a low friction material that can also withstand high temperatures.

One suitable material for the seal can include but is not limited to polyether ether ketone (PEEK). Of course, other suitable materials exist and are within the scope of the invention.

At startup and when the rotating expander 120 is not operating, the expander chamber valve 131 can be open and the inner labyrinth seal 127 rests on the retainer ring 129. During operation of the rotating expander 120 and the plurality of pump impellers 111 can experience a thrust in the direction of the upwardly flowing working fluid 103 flow tending to urge the lower sealing flange 134 upward so as to close the expander chamber valve 131. The expander pressure balance chamber 130 can provide a means to offset the generated thrust.

A portion of the upwardly flowing working fluid 103, shown by small solid arrows in FIG. 2C, can flow between the outer labyrinth seal 126 and the outer pipe 106, through the fluid bearings 125, towards the expander chamber valve 131. The pressure of the upwardly flowing working fluid 103 in the expander pressure balance chamber 130 can increase, exerting pressure on the upper sealing flange 128 and the lower sealing flange 134 tending to open the expander chamber valve 131 and thus moving the rotating expander 120 in a downward direction opposite the direction of flow of the upwardly flowing working fluid 103. The downwardly flowing working fluid 102 flowing from the expander pressure balance chamber 130 through the open expander chamber valve 131 can subsequently proceed into the first annular space formed between the outer pipe 106 and the inner pipe 107, above the rotating expander 120.

Also, during operation, as pressure in the expander pressure balance chamber 130 decreases, the expander chamber valve 131 can close, allowing the rotating expander 120 to move axially upward.

The rotating expander 120 can have components shown including but not limited to a magnetic coupling 114 having the outer rotating cylinder 122 with a plurality of outer magnets 123.

The outer rotating cylinder can rotate around the inner pipe 107 synchronously with the inner rotating cylinder 115.

The inner rotating cylinder can have a plurality of inner magnets 116.

In embodiments, the outer rotating cylinder 122 can be an inner wall of the rotating expander 120.

One skilled in the art will recognize that aspects of the present invention can be applied in numerous different applications, whether downhole or above ground. For example, in an embodiment disclosed herein, torque can be provided to the outer portion of the magnetic coupling by a second pressurized working fluid stream. Other installations, particularly above ground, can instead provide a similar rotating torque to the outer rotating cylinder by different mechanical means, such as a gear drive or a belt and pulley system. Such an arrangement would allow for true in-line pumping of a completely isolated fluid.

In other embodiments, a different type of pump can be selected. The embodiment herein discloses the use of a centrifugal pump. However, other pumps requiring rotating torque can be substituted, such as a twin-screw pump.

One skilled in the art may also recognize that the relative location of the various key parts may be altered. For example, the expander may be axially offset from the outer rotating cylinder instead of the integrated design disclosed herein, or the relative axial locations of the pump and the magnetic coupling may be reversed. Also, in another embodiment, the flow direction of the pressurized working fluid may be reversed if it becomes advantageous to flow the pressurized working fluid downward in the annular space between the inner pipe and the outer pipe.

While these embodiments have been described with emphasis on the embodiments, it should be understood that within the scope of the appended claims, the embodiments might be practiced other than as specifically described herein.

What is claimed is:

1. A compressor free, generator free system for a production well for accelerated oil and gas removal from a reservoir, the compress free, generator free system comprising:

a. a wellbore formed through a formation;
b. a well casing installed in the wellbore;
c. a wellhead connected to the well casing;
d. an outer pipe installed in the well casing concentrically mounted within the well casing forming a first annular space between the well casing and the outer pipe;
e. a downwardly flowing working fluid feeding a rotating expander initially flows into the first annular space and then into a second annular space to reach the rotating expander becoming a supercritical fluid as hydrostatic pressure and heat is applied;
f. an inner pipe installed in the outer pipe having an inner pipe axis for conveying a production fluid, the inner pipe concentrically mounted within the outer pipe forming the second annular space between the outer pipe and the inner pipe;
g. the rotating expander located between the inner pipe and the outer pipe for extracting energy from the downwardly flowing working fluid, the rotating expander comprising a magnetic coupling having an outer rotating cylinder with a plurality of outer magnets, the outer rotating cylinder rotating around the inner pipe synchronously with an inner rotating cylinder, the inner rotating cylinder comprising a plurality of inner magnets, and wherein the outer rotating cylinder is an inner wall of the rotating expander;
h. a pump with a pump shaft installed in the inner pipe for flowing the production fluid to the wellhead;
i. an upwardly flowing working fluid exiting the rotating expander into the first annular space then flowing to the wellhead through the second annular space; and
j. a packer for sealing between the inner pipe and the well casing; and
wherein the compressor free, generator free system provides accelerated oil and gas removal using heat exchanged with the production fluid without expending energy from a compressor or a generator to perform the heat exchange.

2. The compressor free, generator free system of claim 1, further comprising a crossover mounted between the inner pipe and the well casing enabling the downwardly flowing working fluid to exchange with the upwardly flowing working fluid optimizing heat transfer between the production fluid and the downwardly flowing working fluid below the crossover and the upwardly flowing working fluid above the crossover.

3. The compressor free, generator free system of claim 1, wherein the rotating expander comprising:

a. an outer wall; and
b. a plurality of integral expander vanes attached to the outer wall, the plurality of integral expander vanes convert a reduction of pressure in the downwardly flowing working fluid into rotating torque.

4. The compressor free, generator free system of claim 1, comprising a retainer ring extending radially and outwardly from the inner pipe toward the well casing providing axial support for the rotating expander.

5. The compressor free, generator free system of claim 1, comprising:

a. a pump pressure balance chamber between a pump housing formed around the pump;
b. a disc attached to an upper end of the pump shaft to offset generated thrust produced by moving the production fluid to the wellhead; and
c. a labyrinth seal interposed between the pump shaft and the pump housing to control the flow of the production fluid into the pump pressure balance chamber, wherein the pump pressure balance chamber is positioned between the disc and the pump housing, and wherein the pump pressure balance chamber compensates for axial thrust from the pump.

6. The compressor free, generator free system of claim 1, comprising an outer labyrinth seal in the outer pipe configured to flow the upwardly flowing working fluid through a plurality of fluid bearings and into the first annular space between the outer pipe and the inner pipe towards an expander chamber valve between the outer pipe and the inner pipe, the expander chamber valve enabling pressure of the upwardly flowing working fluid to flow into an expander pressure balance chamber of the rotating expander and increase in pressure, exerting pressure simultaneously, on an upper sealing flange and a lower sealing flange located between the outer pipe and the inner pipe opening the expander chamber valve and moving the rotating expander in a downward direction opposite the direction of flow of the upwardly flowing working fluid, the plurality of fluid bearings radially supporting the rotating expander.

7. The compressor free, generator free system of claim 1, comprising an inner labyrinth seal attached to the rotating expander to bypass a portion of the upwardly flowing working fluid around the rotating expander.

8. The compressor free, generator free system of claim 1, wherein the pump shaft extends through the inner rotating cylinder, the pump shaft comprising at least one of a plurality of spokes at least one spoke of the plurality of spokes extending from the pump shaft and connecting to the inner rotating cylinder.

9. The compressor free, generator free system of claim 8, comprising a hollow bore in the pump shaft, the hollow bore configured to flow a portion of the production fluid from a pump pressure balance chamber through an open pump chamber valve around a disc into the hollow bore, whereupon the portion of the production fluid flows to a relatively low pressure below the at least one spoke of the plurality of spokes.

10. The compressor free, generator free system of claim 5, wherein the disc comprises a second upper seal configured to seal against a sealing surface attached to the pump housing.

11. The compressor free, generator free system of claim 6, wherein the expander chamber valve comprises a first upper seal and a lower sealing surface.

12. The compressor free, generator free system of claim 1, wherein the pump pumps the production fluid coaxially with the inner pipe.

13. The compressor free, generator free system of claim 1, comprising a non-magnetic cylindrical wall separating the outer rotating cylinder from the inner rotating cylinder, the non-magnetic cylindrical wall configured for separating the production fluid from either the downwardly flowing working fluid or the upwardly flowing working fluid.

14. The compressor free, generator free system of claim 1, comprising a plurality of pump impellers in the pump, the plurality of pump impellers increase pressure of the production fluid enabling the production fluid to flow to the wellhead inside of the inner pipe.

15. The compressor free, generator free system of claim 1, wherein the pump is installable and retrievable through the inner pipe.

* * * * *